INVENTOR.
MORRIS A. SHERKIN

Dec. 29, 1970  M. A. SHERKIN  3,550,443
METHOD AND APPARATUS FOR INSPECTING TIRES
Filed Nov. 19, 1968  8 Sheets-Sheet 6
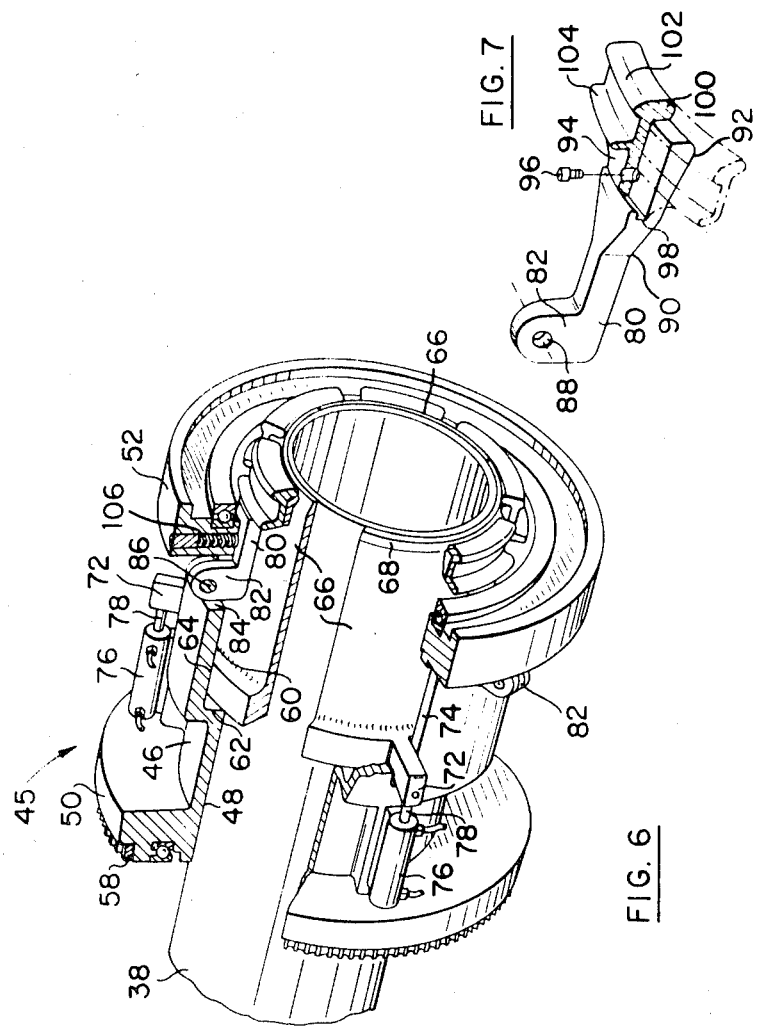
INVENTOR.
MORRIS A. SHERKIN
BY Fetherstonhaugh & Co.
ATTORNEYS

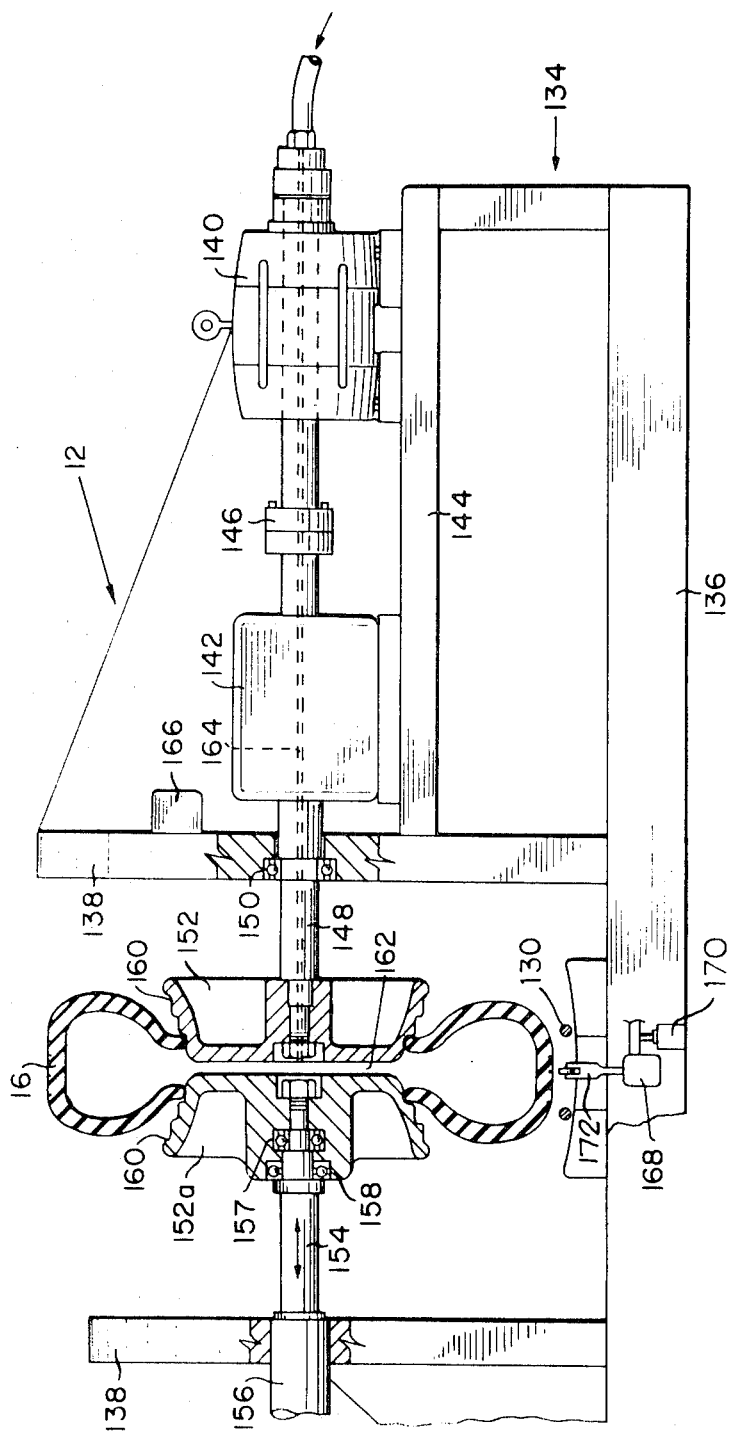

United States Patent Office 3,550,443
Patented Dec. 29, 1970

3,550,443
METHOD AND APPARATUS FOR INSPECTING TIRES
Morris A. Sherkin, 76 Ridelle Ave.,
Toronto, Ontario, Canada
Filed Nov. 19, 1968, Ser. No. 777,077
Int. Cl. G01n 17/02
U.S. Cl. 73—146                                22 Claims

ABSTRACT OF THE DISCLOSURE

A tire testing device for the non-destructive testing of the structure of a tire. The device includes a frame having a pair of oppositely disposed chucks mounted to move towards and away from one another in a tire testing station. The apparatus also includes a feeding device for feeding tires one at a time into the testing station. The chucks of the testing apparatus are adapted to engage the bead edge of a tire and to cyclically move away from another and towards one another to move the bead edges of a tire outwardly from one another to substantially flatten the tire cross-section. The apparatus also includes a device for x-raying the tire in its flattened configuration. The device also includes monitoring apparatus for monitoring the radiation signals.

---

The present invention also provides a tire testing device for inspecting the roundness and dynamic balance of an inflated tire. This apparatus includes support means adapted to sealingly engage bead edges of a tire and passage means communicating with the interior of the tire for supplying air under pressure to the interior of the tire. Drive means are provided for rotating the support means to rotate the tire and roundness testing means are adapted to bear against the surface of the tire for detecting variations in the radius of the tire generated from the axis of rotation. Preferably this apparatus also includes dynamic balance testing means in the same structure.

The combination of the roundness testing and dynamic balance testing means arranged in series with the tire structure testing apparatus is a further embodiment of this invention which provides a comprehensive apparatus for testing the principal variable features of a tire.

FIELD OF INVENTION

This invention relates to an improvement in the art of inspecting tires. In particular the invention relates to an improved method and apparatus for the non-destructive testing of tires on a continuous basis.

PRIOR ART

Many of the major faults which occur in the manufacture of a tire cannot be detected by a normal visual inspection when the tire is complete. Faults such as separation or overlapping of the reinforcing layers are well known to the industry but they cannot be detected by the known non-destructive tests. Tests for roundness and balance are generally carried out on a random basis. To date no method or apparatus for the testing of all of these critical features has been devised for use on a continuous basis.

SUMMARY OF INVENTION

The tire testing method and apparatus of the present invention provides a method of detecting faults in the structure, balance and roundness of tires without requiring the destruction of the tire. The apparatus is suitable for operation in a production line such that all of the tires produced may be tested thereby removing the dangers associated with random testing in the tire industry.

According to an embodiment of the present invention a tire testing device for testing the tire structure comprises an inspection station and means for moving a series of tires one at a time into the inspection station. Support means are provided in the testing station which are adapted to engage with and disengage from opposed sides of a tire in the station. Spreading means are provided for cyclically spreading the support means from a normal position wherein the support means engages a tire to an expanded position wherein the cross-section of a tire retained therein is flattened to a point just short of the point at which the tire would buckle and cause permanent damage to the structure of the tire and then back to the normal position. The apparatus also includes means for rotating the support means to rotate a tire retained therein when the support means is in the expanded position and a detecting device for detecting tire faults. Radiation means is adapted to be located inwardly of the tire for directing probing radiation through the flattened portion of the tire to the detecting device and the detecting device is adapted to detect tire faults probed by the stream of probing radiation.

The present invention also provides an improved method of inspecting the structure of a series of tires which comprises the steps of conveying the tires one at a time into an inspection station, supporting the tires for rotation within the station in an expanded position wherein the cross-section of the tire retained therein is flattened to an extent just short of the axially extended position in which the tire would buckle and permanently damage the tire structure, directing a penetrating ray from the inside of the tire to a detecting device located on the outside of the tire, rotating the tire to move the entire circumference of the tire through the stream of probing radiation, disengaging the tire from the inspection station and selectively accepting or rejecting the tire on the basis of the test results.

The present apparatus also provides a tire testing device which comprises an inspection station, means for moving a series of tires one at a time into said inspection station, support means adapted to sealingly engage with and disengage from opposite walls of a tire to support an inflated tire in said station, passage means communicating with the interior of the tire mounted in support means and inflation means for supplying air under pressure to the interior of the tire by way of said passage. The testing device also includes drive means for rotating the support means to rotate a tire in said station and roundness testing means adapted to bear against the surface of a tire in said station for detecting variations in the radius of a tire generated from their axis of rotation of the tire as the inflated tire is rotated in the station. Preferably this apparatus also includes dynamic balance testing means combined in the same structure as the roundness testing means.

The present invention also provides tire testing apparatus which includes serially connected radiation probing means and roundness and balance testing means as previously described.

The invention will be more clearly understood after reference to the following detailed specification read in conjunction with the drawings, wherein:

FIG. 3 is a partially sectioned front view similar to

Figure 2:
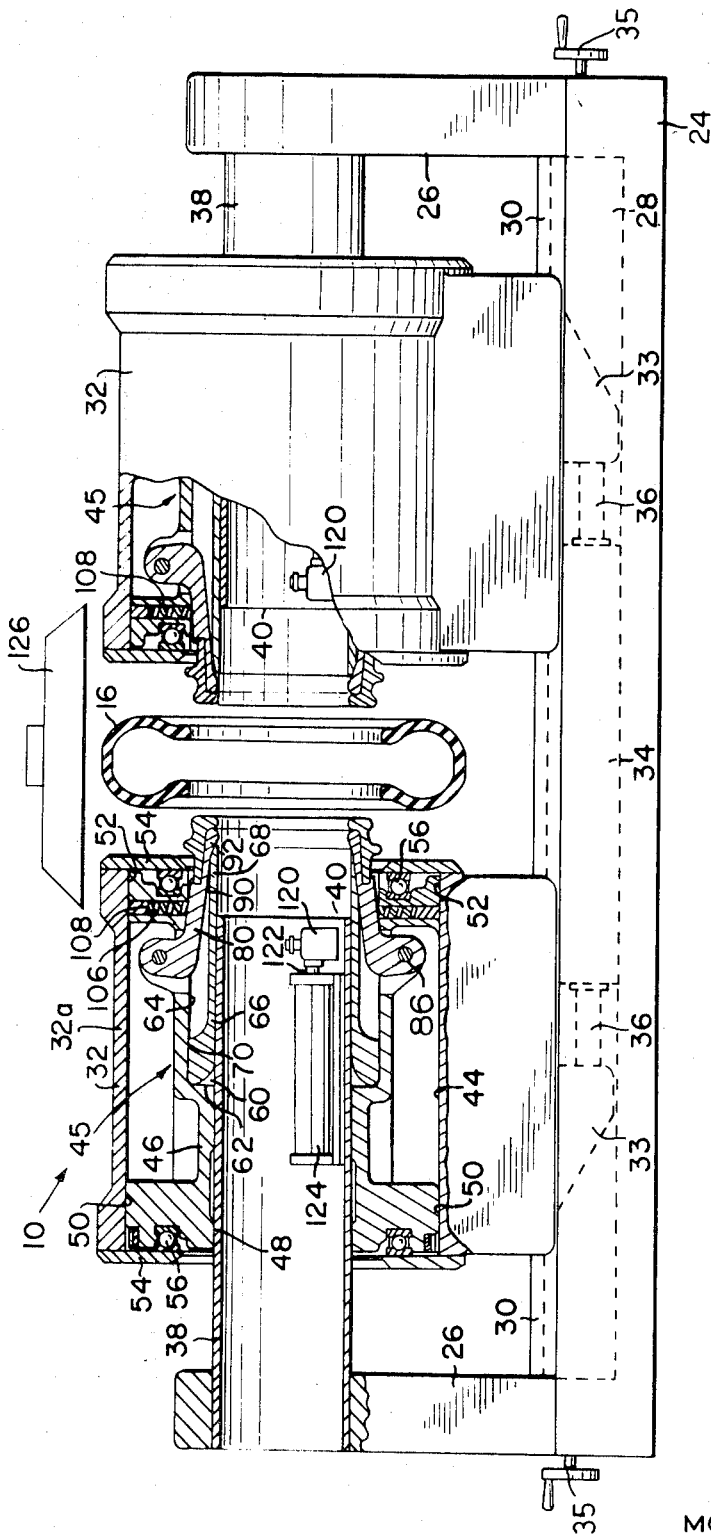
FIG. 2 is a partially sectioned front view of the tire testing device used to detect faults in the construction of a tire when in a position to receive a tire.

FIG. 2 showing the support means in an inwardly collapsed position.

Figure 4:
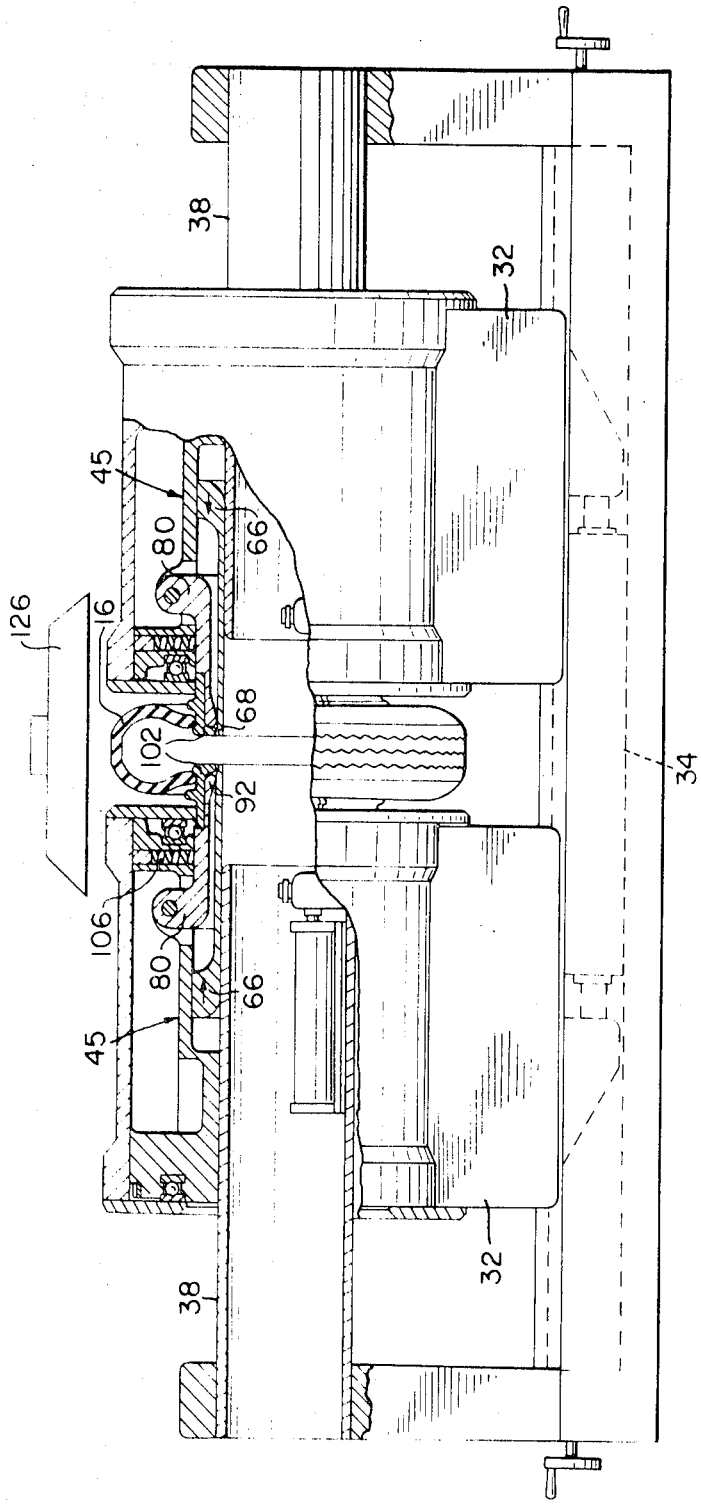

FIG. 4 is a partially sectioned side view similar to FIG. 2 showing a further step in the operation of the testing machine.

Figure 5:
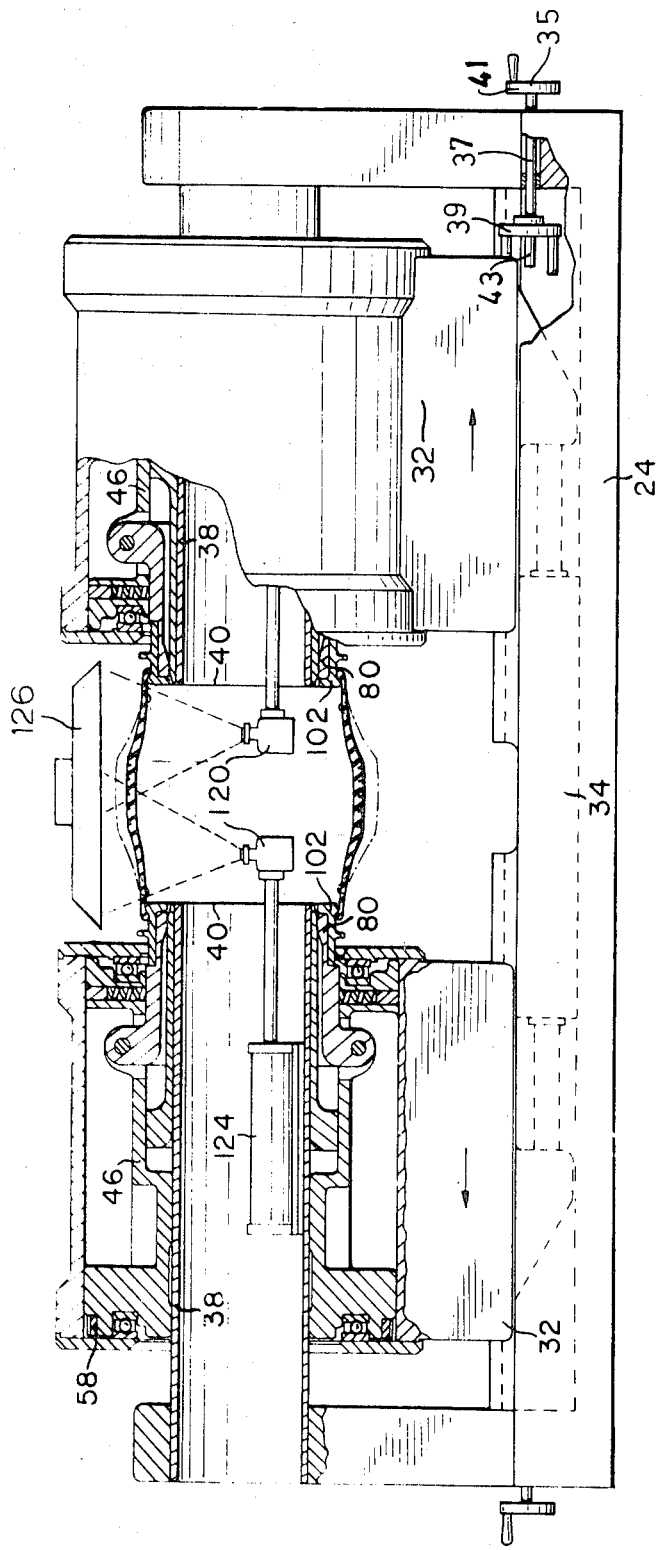

FIG. 5 is a further cross-sectional view similar to FIG. 2 showing a tire mounted in a position wherein the cross-section of the tire is substantially flattened for inspection by probing radiation.

FIG. 6 is a partially sectioned pictorial view of the tire mounting means of FIG. 2.

FIG. 7 is an enlarged detail view of a supporting jaw of the chuck illustrated in FIG. 6.

Figure 9:
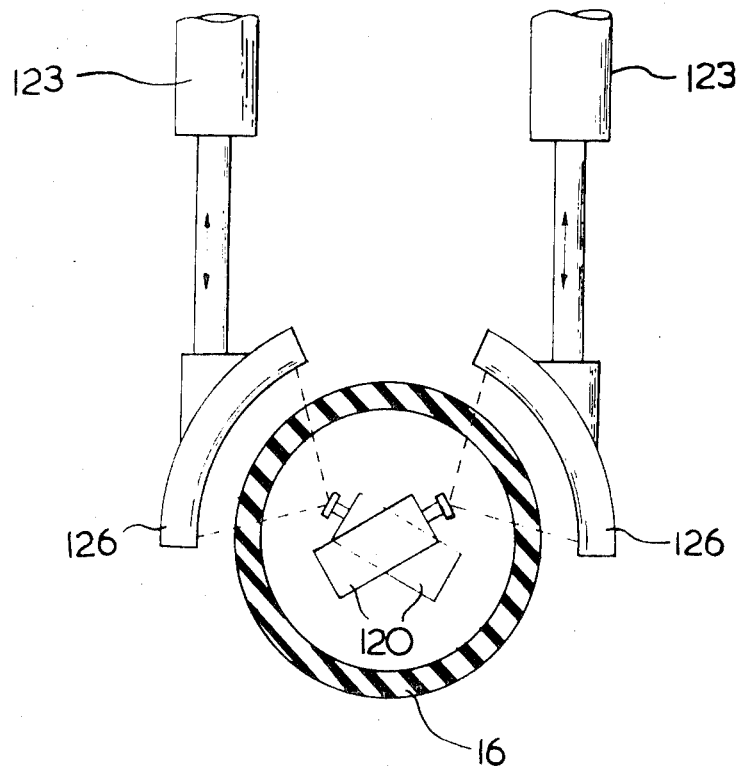

FIG. 8 is a diagrammatic cross-sectional view of a roundness and dynamic balance testing device according to a further embodiment of this invention, and FIG. 9 is a partial cross-sectional view showing an alternative arrangement of radiation heads and receiver screens.

Figure 1:
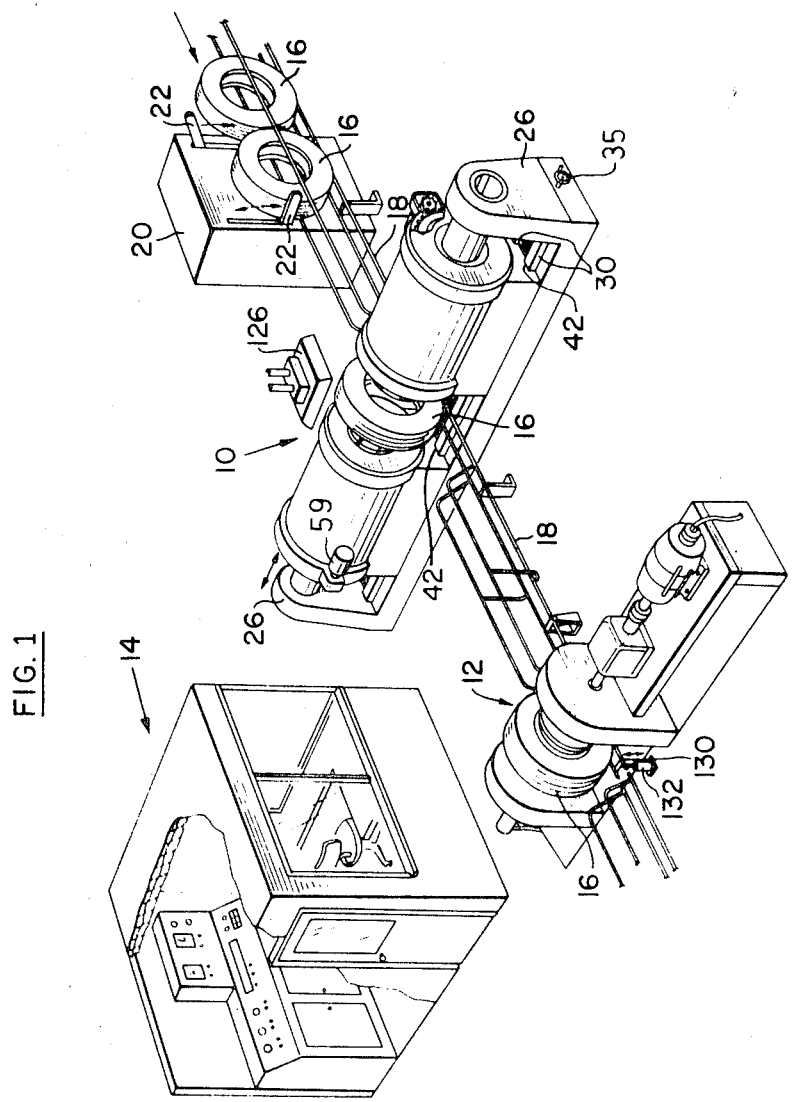
FIG. 1 is a pictorial view of the tire testing apparatus and inspection chamber according to an embodiment of the present invention.

With reference to FIG. 1 of the drawings it will be seen that the apparatus of the present invention is designed to enable the inspection of the structural quality of a tire to be carried out in a first tire testing device generally indicated by the reference numeral 10 and the inspection of the dynamic balance and roundness of a tire to be carried out by a dynamic inspction device 12. The operation of the testing devices 10 and 12 and the evaluation of the test results is carried out in a control room or inspection chamber 14. A series of tires 16 are moved one at a time into the tire testing devices 10 and 12 and are guided in their movement by a suitable conveyor such as that identified by the reference numeral 18. The one at a time movement of the tires is controlled by a tire feeding device which is diagramatically illustrated at 20 and which may include a pair of pivoting arms 22 which are designed to permit only one tire at a time to pass along the conveyor 18. The control room 14 is preferably located close to the actual testing machines and may be constructed from an insulating material adapted to protect the operator against the effects of the probing radiation emitted by the inspecting device 10. The entire operation of the devices 10 and 12 may be controlled from the control room 14 and suitable means may be provided for selectively withdrawing any tire from the conveyor which fails to pass the predetermined inspection standards.

The structure of the tire inspecting device 10 will be more clearly understood with reference to FIGS. 2, 6 and 7. As shown in FIG. 2 the first testing device 10 includes a frame which comprises a base or bed 24 having a pair of support pillars 26 extending upwardly therefrom. A pictorial end view of the support pillars 26 is shown in FIG. 1. The base 24 is formed with a suitable recess 28 located centrally thereof and shown only in broken lines on FIG. 2. A pair of guide rails 30 are also formed integrally with the base 26 and spaced on opposite sides of the recess 28 to slidably support a pair of chuck housings 32. A double-acting hydraulic cylinder 34 is located in the recess 28 and connected to the lower extensions 33 of the chuck housings 32 by connecting rods 36. The hydraulic cylinder 34 is adapted to be activated cyclically to move the chuck housings apart from one another or towards one another on the base 24 as will be described hereinafter. The outward movement of the chuck housings on the guide rails is variably limited by the stroke adjusting device 35 which is described hereinafter.

Hollow support shafts 38 are rigidly connected to the support pillars 26 and extend inwardly therefrom parallel to the base 24. The hollow support shafts 38 are axially aligned with one another and cooperate with the base member 24 to slidably support the housings 32. The inner ends 40 of the support shafts 38 are spaced from one another a sufficient distance to form a tire testing station therebetween to permit a tire to be extended to the widest position shown in FIG. 5.

The stationary components of the testing device are the previously described base 24, double-acting hydraulic cylinder 34, end support pillars 26 and hollow cylindrical support shafts 38.

The housings 32 and the component parts carried therein are identical and consequently only one of the housings will be described in detail. Each housing 32 consists of a main body portion 32a which is formed at its lower end with a pair of channels 42 which are adapted to receive the guide members 30 (see FIG. 1) which serve to guide the reciprocating movement of the housings 32 on the base 24. The housing 32 is also formed with a passageway which has a cylindrical side wall 44 which is adapted to be located co-axially with respect to the axis of the hollow support shafts 38. A pair of chucks, identified generally by the reference numeral 45, are mounted for rotation in the housings 32. Each chuck consists of a sleeve 46 which carries various other components which will be described in detail below. The sleeve 46 is rotatably supported by shaft 38 by means of an internal bearing surface 48 and rotatably supported by the cylindrical surface 44 of the housing 32 by means of bearing surfaces 50, 52 (see FIG. 2). Axial movement of the sleeves 46 with respect to the housings 32 is prevented by end plates 54. Thrust bearings 56 are mounted between the end plates 54 and the sleeve 46 to permit free rotation of the sleeve 46 within the housing 32. Gear teeth 58 are provided at the outer circumferential edge of the outer end of the sleeve 46 to co-operate with suitable drive gear of a reversible electric motor 59 (see FIG. 1) which is carried by each housing 32 for rotating the sleeve 46 about the shaft 38 within the housing 32.

An annular recess 60 is formed within the sleeve 46 and opens outwardly from the inner end of the sleeve 46. The recess 60 has a radial shoulder 62 and a cylindrical bearing surface 64. Three wedge members 66 are slidably mounted within the recess 60 and are adapted to embrace and slide axially with respect to the support shaft 38. The three wedge members 66 are in the form of segments of a cylindrical wedge which extends around the entire circumference of the support shaft 38. The outer or leading edge 68 of the wedge is suitably tapered to facilitate the initial wedging action which will be described hereinafter. A collar of increased thickness is formed at the inner end of each wedge 66 and has a bearing surface 70 adapted to co-operate with the bearing surface 64 of the sleeve 46. Lugs 72 extend radially outwardly from each of the wedge members 66 through axially extending slots 74 formed in the wall of the sleeve 46. Double-acting drive cylinders 76 are connected to the lugs 72 of the wedge members by connecting rod 78. The double-acting drive cylinders 76 are adapted to cause the wedge member to reciprocate relative to the sleeve 46 in an axial direction with respect to the support shafts 38. Suitable means is provided to permit the introduction of hydraulic fluid into the housing 32 to the drive cylinders 76 whereby the sleeves 46 may be rotated constantly in one direction or the direction of the rotation of the sleeves may be reversed after each tire has been tested.

A plurality of jaws 80 (see FIG. 7) are disposed at equally spaced circumferential intervals about the sleeve 46 (see FIG. 6). The inner ends 82 of the jaws 80 are adapted to extend through openings 84 formed in the wall of the sleeve 46. The inner ends 82 of the jaws are pivotably connected to the sleeve 46 by means of pivot pins 86 which extend through the openings 88 formed therein. The inner circumferentially extending surfaces 90 of the jaws 80 are formed with radially inwardly directed shoulders 92 at the inner ends thereof. Removable tire gripping segments 94 are connected to the outer end of the jaws 80 by a suitable screw 96. The inner ends of the tire segments 94 are located within a register channel 98 and the outer ends thereof have a lower radially inwardly extending projection 100 which overlies the outer edges of the jaws 80. The upper surface of the tire gripping segments 94 are formed with tire gripping lips 102 and shoulder stops 104. The tire gripping lips 102 and shoulder stops 104 of each of the six segments co-operate with one another to form a discontinuos circumferential gripping means for gripping and supporting the bead edge of a tire as will be described hereinafter.

Compression springs 106 are located within openings 108 in the sleeves 46 and bear against the upper surface of each of the jaws 80. The compression springs 106 constantly urge the jaws radially inwardly and the inward movement of the jaws is limited by the location of the wedging member 66 and the support shaft 38.

Probing ray emitting units 120 are normally located in a withdrawn position within the hollow interior of the support shafts 38. The units 120 are mounted on the end of reciprocating shafts 122 of double-acting hydraulic cylinders 124. The hydraulic cylinders 124 are adapted to move the probing heads 120 into the tire inspection station which is formed between the inner ends 40 of the hollow support shafts 38 as will be described hereinafter.

A probing ray receiver screen 126 is movably mounted above the inspection station and supported by a suitable hydraulic cylinder for movement towards and away from the tire as required in use. The hydraulic cylinder may be supported by a support stand or overhead means of the type normally forming part of the roof structure of the building in which the unit is to be operated. The probing ray emitter head 120 is preferably an X-ray unit and the receiver 126 is a screen suitable for receiving the radiation emitted from the X-ray heads and transmitting this information to a suitable detecting device located within the control room 14. The detecting device may be in the form of a monitor screen projecting a visual image of the structure of the tire which is penetrated by the probing ray. The receiver screen 26 is mounted for vertical movement such that it may be moved to a position close to the outer surface of the tire when the tire is in the spread position illustrated in FIG. 5. This will have the effect of reducing the spread angle of the probing radiation and providing a sharply defined image on the monitoring screen.

An alternative arrangement of radiation heads 120 and screens 126 is shown in FIG. 9. In this embodiment a pair of double-acting cylinders 123 support a pair of receiver screens 126 in a position above and to opposite sides of the tire 16 mounted in the support means. The screens 126 may be raised from the position shown in FIG. 9 to permit the tire to enter and leave the testing station. The heads 120 are arranged to direct streams of radiation towards the screens 126 and with this arrangement of angularly displaced beams of radiation it is possible to activate both radiation heads simultaneously as the portion of the tire radiated by one head will be picked up by one screen while the portion of the tire radiated by the other head will be picked up by the other screen. The images transmited from the receiver screens 126 to the monitor may appear side-by-side in the control room. The fact that the two images do not relate to side-by-side portions of the tire is irrelevant as this test is not designed to locate the exact point at which a defect occurs but only to indicate the presence of unacceptable defects.

Figure 3:
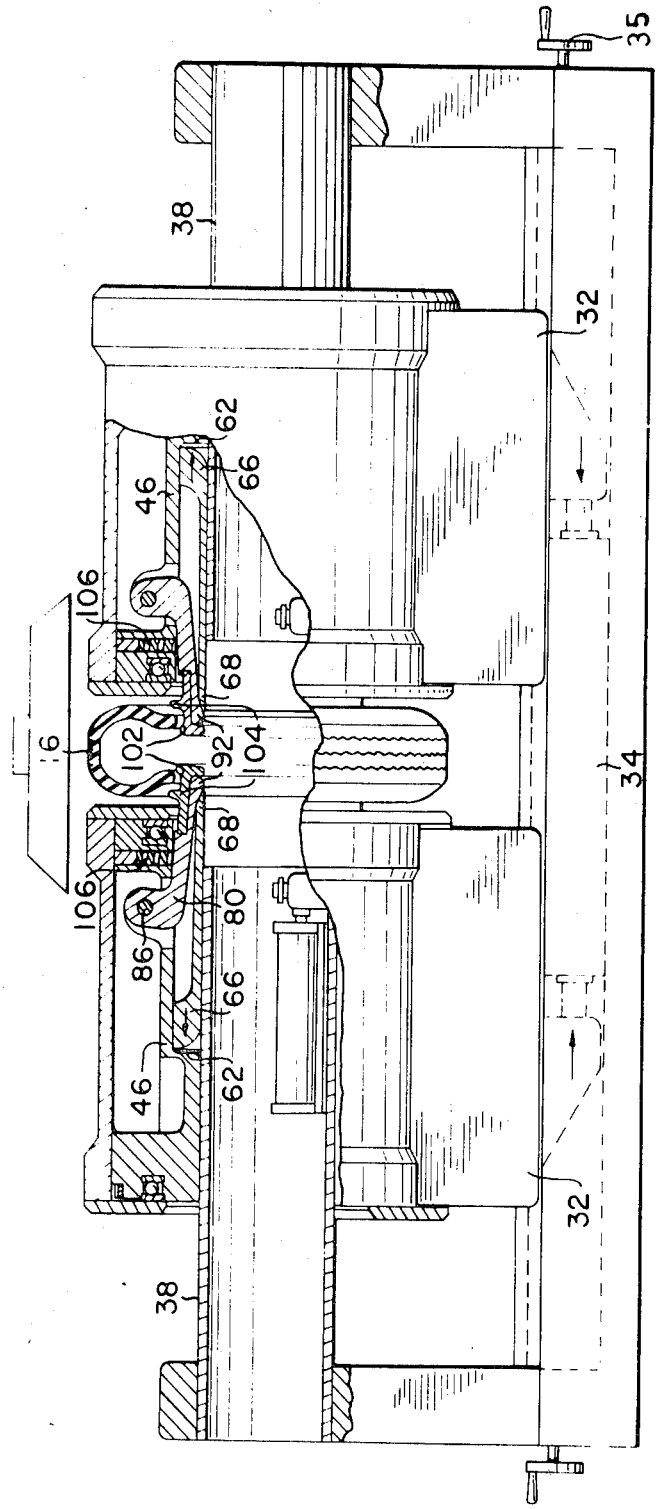

The operation of the tire testing device 10 will be clearly understood with reference to FIGS. 2 to 5 and 9. A tire 16 passes from the feeding device 20 into the testing station between the chucks 45 of the tire testing device 10 when the chucks 45 are located in the starting position illustrated in FIG. 2 and a tire 16 is located therebetween. The jaws 80 are collapsed radially inwardly to a position wherein the diameter defined by the gripping lip 102 of the jaws 80 is less than the bead diameter of the tire 16 to be tested. Where tires of different bead diameters are to be tested the necessary adjustments to the apparatus may be made by selecting a suitable series of gripping segments 94. The use of various gripping segments to provide different bead supporting diameters enables this apparatus to be used over a wide range of bead diameters without requiring any skilled adjustment techniques. When the chucks 45 are in the radially inwardly collapsed position illustrated in FIG. 2 the hydraulic cylinder 34 is activated to bring the housings 32 together to cause the lip gripping edges 102 to pass under the bead edges of the tire 16. The shoulder 104 is located outwardly of the bead edge of the tire when the jaws of the chuck are in their operative position radially inwardly of the tire as shown in FIG. 3.

Expansion of the chucks 45 is effected by activating the drive cylinders 76 (FIG. 6) to cause the wedge members 66 to move towards the jaws 80 to a position wherein they underlie the inner edges 92 thereof and cause the effective diameter of the gripping segments to increase to a sufficient diameter to firmly grip the bead edge of the tire in the testing station. When the wedge 66 is in the position shown in FIG. 4 relative to the jaws 80 the diameter of the chuck cannot be reduced by any adjustment means and consequently a very accurate predetermined tire bead supporting diameter can be provided thus ensuring accurate mounting of a tire within the testing device. The load applied to the bead edge of the tire 16 as a result of the expansion of the chucks is sufficient to ensure that the lip 102 will grip the bead edges when the tire is axially opened out to either of the positions shown in FIG. 5.

The bead edges of the tire are moved outwardly away from one another by activating the spreading cylinder 34 to cause the housings 32 to move away from one another. The movement of housings away from one another will continue until the tire is axially opened out or substantially flattened to a point just short of the point where the tire would be permanently damaged by buckling. The extent to which a tire may be flattened or axially extended will depend upon the structural characteristics of the tire, for example, a flexible 2 ply tire may be flattened to a greater extent than a relatively rigid 4 ply tire. The outward movement of the housings 32 is limited by adjustable stops 35 which are rigidly connected to the frame uprights 26 and consist of a shaft 37 which is rotatable in the uprights 26, an inner head plate 39 and an adjustment wheel 41. A plurality of pins 43 of various lengths are carried by the head plate 39 and one pin is disposed in a position to abut the housing 32 to limit its outward movement and thereby limit the extent of flattening of the tire. The adjustment wheel 41 may be manually or automatically rotated to locate whichever of the pins 43 is required to be disposed in an abutting relationship with respect to the housings 32. During the movement of the housings 32 relative to the stationary frame members previously described no other relative movement takes place between the structural elements of the chucks 45. The edges 102 of the jaws 80 support the bead edges of the tire 16 and the hydraulic cylinder 34 acts as a spreading means causing ggthe housings 32 and therefore the chucks to move away from one another to a position wherein the cross-section of the tire 16 is axially opened out or flattened to an extent just short of the point where the tire would buckle and permanent damage would be caused by the flattening. The hydraulic cylinders 124 are then activated to move the probing heads 120 to the position shown in FIG. 5 or wherein they are located in the testing station between the ends 40 of the hollow support shafts 38 and suitably positioned relative to the substantially flattened tire 16 and the receiver 126 to direct a probing ray through a portion of the flattened tread of the tire to the receiver 126. One of the probing heads 120 is then activated and the tire is rotated through a complete revolution to inspect the portion of the tire probed by the radiation from one head which, as shown in broken lines in FIG. 5, will extend to cover at least half of the width of a tire. The receiver 126 transmits a signal to the control room 14 and the operator is able to determine from the monitor whether the tire structure is satisfactory or defective. After one revolution has been completed the first radiation head is deactivated and the second head is activated. The direction of rotation of the tire is then preferably reversed and the tire rotated through a complete revolution to direct the probing ray from the second head through the other half of the tire. Again the results of the test are transmitted to a monitor in the control room and the tire is accepted or rejected by the operator. In this embodiment the two heads 120 are not activated simultaneously as they would cause an overlapping of the radiation beams to occur with the result that a satisfactory image could not be provided on the monitor. When the probing heads 120 are arranged as shown in FIG. 9, both heads are activated simultaneously and project a beam of radiation to the co-operating receiver screens 126 such that only one revolution of the tire is required to complete an inspection of the tire.

After the radiation testing of the tire has been completed the tire is released by a reversal of the steps previously described in the operation of mounting the tire. Thus the radiation heads are withdrawn within the hollow sleeves 38, the housings 32 are moved toward one another, the wedges 66 are withdrawn from their position underlying the jaws 80, the jaws 80 are radially inwardly collapsed by the springs 106 and the housings 32 are moved away from one another to release the tire. If the tire is unsatisfactory it may then be suitably marked by any form of automatic marking device or removed from the conveyor or if the tire is satisfactory it may be passed to the next inspection operation.

A number of important structural features of the tire testing device described above will be apparent from the aforegoing description of the apparatus and its method of operation. One such feature is the provision of a hollow tubular support shaft for supporting the radiation heads in a protective enclosure when they are not in use. The practical advantages of this construction are very substantial in an industry such as the tire building industry where machinery must operate at high speed and must be sufficiently rugged to operate without the need for careful handling.

The advantages of using a probing ray such as X-rays for penetrating the tread of a tire are that it is possible to detect tire faults such as separation or overlapping of the reinforcing layers of the tire which cannot be detected by a normal visual test. Preferably the operator in the control room will be provided with a monitoring screen upon which the X-ray picture will be projected and he will be able to start and stop the rotation of the tire with respect to the stream of probing radiation in order that any localized area of the tire may be carefully examined. While X-ray radiation has proved to be satisfactory for the purpose of detecting faults in the structure of a tire tread the apparatus of the present invention is not limited to its use with a source of X-ray radiation and other forms of radiation such as alpha, beta and gamma rays may be satisfactorily employed. Generally the tire faults such as overlapping of the reinforcing structure are to be found within the first quarter inch of thickness from the inner wall of the tire and consequently it is desirable to probe the structure of the tire by a penetrating ray emitted from a source disposed within the tire directing radiation from the inside surface through the wall of the tire to a receiver mounted outwardly of the tire.

The stretching or spreading of the tire in the manner illustrated in FIG. 5 presents a substantially flat surface which by virtue of the rigidity of the clamping chucks will be maintained at a substantially constant distance relative to the probing head 120 and the receiver 126. It will be apparent that if a probing head was inserted in a tire in its normal rounded condition only a very small portion of the tire tread could be examined by radiation testing means as the curvature of the wall of the tire would distort the available image. The receiver 126 of the present invention may have a curved receiver surface extending substantially parallel to the curvature of the expanded tire in order that a substantial portion of the receiver surface is substantially uniformly spaced from the tire.

After inspection in the probing radiation testing device the tire 16 then moves to a roundness and dynamic testing device 12 by way of a conveyor guide 18. The tire 16 is supported in the testing device 12 by a platform 130 which is supported by jacks 132 such that it may be elevated or lowered as required in use. Referring to FIG. 8 of the drawings it will be seen that the roundness and dynamic balance testing device includes a frame generally indicated by the reference numeral 134. The frame includes a base 136 and a pair of upright supports 138. A variable speed electric motor 140 and a stabilizer bearing box 142, of the type commonly used in dynamic balance testing machines, are supported on a platform 144 in axial alignment with one another and connected to one another by means of a coupling 146. The output shaft 148 of the stabilizer 142 is mounted in the usual stabilizer bearings within the stabilizer 142 and in the adjacent sidewall 132 of the frame by means of a suitable ball bearing 150. A rim support member 152 is rigidly secured to the inner end of the shaft 148 and adapted to rotate therewith. A second shaft 154 is supported by a hydraulic cylinder 156 which is in turn carried by the other wall 138. A second rim supporting member 152a is mounted for free rotation on the shaft 154 by means of bearing 157 and thrust bearing 158. The hydraulic cylinder 156 is adapted to move the rim engaging member 152a towards and away from the rim member 152 as required in use. A bead engaging surface 160 of each of the rim members is formed with a plurality of shoulders of differing diameter adapted to cooperate with corresponding shoulders on the opposite rim member to provide bead engaging surfaces of differing diameters adapted to support tires of differing bead diameter. A further important feature of this invention is the provision of inflation passage means communicating between the interior of the tire 16 mounted on the rim support means and a source of pressurized air. Preferably the inflation passage means is formed by ensuring that the rim means 152 and 152a are spaced apart a sufficient distance when mounted in their operatvie position relative to a tire to provide an opening 162 therebetween. Pressurized air is introduced to the opening 162 by way of a passageway 164 which extends through the shaft 148, stabilizer 142, coupling 146 and the shaft of the electric motor 140.

The roundness testing device 168 is mounted on a support jack 170 and has a plunger 172 with a guide roller 174 mounted at the upper end thereof. Variations in the roundness of a tire cause the plunger 172 to rise and fall and these variations are graphically illustrated on a suitable chart in the control room. The dynamic balance testing device diagrammatically illustrated at 166 may be of any of the well-known dynamic balance testing devices in common use.

When the dynamic testing apparatus is in use the rim member 152 is withdrawn by the hydraulic cylinder 156 to provide sufficient space between the two rim supporting members to permit a tire 16 carried on the conveyor to move into a position between the two rim members. A rim member 152a is then moved towards the rim member 152 to engage the bead edge of the tire 16 with the appropriate bead edge engaging surfaces thereof. The jacks 132 are then activated to lower the guide rail 130 and air under pressure is delivered to the interior of the tire to inflate the tire. As the tire is inflated the increasing pressure will cause the rim member 152a to move away from the rim member 152 to provide the gap between the bead edges of the tire which is normally present when the tires are mounted on a wheel rim in an inflated condition.

The tire is then driven at several speeds ranging from speeds equivalent to 30 miles per hour to speeds equivalent to 100 miles per hour and the dynamic balance of the tire is determined by the conventional means which are adapted to permit the result of the test to be transmitted to a control room. After the balance test has been completed the jacking cylinder 170 is activated to move the roller 174 of the roundness testing means into contact with the surface of the tire and the tire is rotated at a slow speed, for example 2 r.p.m. Variations in the roundness of the tire are transmitted to the graphic indicator in the control room and the "TOTAL INDICATOR RUN-OUT" is graphically illustrated. After at least one complete revolution of the tire the cylinder 170 is deactivated and the roundness testing device lowered. The tire is then deflated and the guide rail 130 elevated and the tire removed from the support by withdrawing the rim member 152a. The tire is then accepted or rejected on the basis of the results of the balance test and roundness test.

There is considerable advantage in combining the roundness testing apparatus with the dynamic balance testing apparatus as both require the tire to be inflated before these tests are carried out. The roundness test is believed to be extremely important in that it compliments the dynamic balance test. Experience has shown that a tire which would pass a dynamic balance test can be so far out-of-round that they would create an uncomfortable vibration when in use. It will be understood that tires with minor faults in the dynamic balance may be accepted due to the fact that the dynamic balance can be corrected by the application of weights to the wheel, however, no application of weights to the wheel can correct errors in the roundness of a tire which frequently escape the normal inspection procedures now in use.

From the aforegoing it will be apparent that the combination of the structural testing device arrangement in series with the roundness and dynamic balance testing device provides an apparatus capable of carrying out valuable non-destructive testing of tires on a high speed production basis.

Various modifications of the present invention will be readily apparent to those skilled in the art without departing from the scope of this invention.

What I claim is:

1. A tire testing device comprising: an inspection apparatus having an inspection station therein and means for moving a series of tires one at a time into said inspection station, said inspection apparatus including support means adapted to engage with and disengage from opposed beads of a tire in said station, spreading means for cyclically spreading said support means from a normal position wherein the support means engages a tire to an expanded position wherein the cross-section of a tire retained therein is flattened and then back to said normal position, means for rotating said support means to rotate a tire retained therein when said support means is in said expanded position, a detecting device for detecting tire faults, radiation means adapted to be located inwardly of the tire for directing probing radiation through the flattened portion of the tire to said detecting device, said detecting device being adapted to detect tire faults probed by said stream of probing radiation.

2. A tire device as claimed in claim 1, wherein said support means includes a pair of cooperating chucks each mounted for rotation and adapted to engage a bead edge of a tire and having their axes of rotation in alignment.

3. A tire testing device as claimed in claim 2, wherein said chucks are radially adjustable to permit them to contract radially to pass inwardly of the opposite bead edges of a tire and to expand radially to rigidly engage the opposite edges of a tire.

4. A tire testing device as claimed in claim 1, wherein said support means includes a frame, a pair of housings slidably mounted on said frame, a chuck mounted for rotation in each of said housings, said chucks being adapted to engage a bead edge of a tire and having their axes of rotation aligned with one another, said housings being slidable on said frame to permit said chucks to move towards and away from one another.

5. A tire testing device as claimed in claim 4, including adjustment means for radially adjusting said chucks to contract radially to permit them to pass inwardly of the opposite edges of a tire and to expand radially to rigidly engage the opposite edges of a tire.

6. A tire testing device as claimed in claim 5, wherein said radial adjustment means includes expansion means slidably movable relative to said housing for expanding said chuck and spring means for contracting said chuck.

7. A tire testing device as claimed in claim 4, wherein said chuck includes a sleeve rotatably mounted in said housing, a plurality of jaws, each of said jaws being pivotably mounted at its inner end to said sleeve and having an outer end extending outwardly from said housing, the outer ends of said jaws being formed to grip the bead edge of a tire, radial expansion means adapted to cause said jaws to pivot about their inner ends to radially expand the outer ends thereof into engagement with a tire, contraction means adapted to cause said jaws to pivot about their inner ends to radially contract said jaws when said expansion means is disengaged.

8. A tire testing device as claimed in claim 1, wherein said radiation means comprises: at least one radiating head mounted for movement into and out of said station.

9. A tire testing device as claimed in claim 1, including a pair of radiating heads mounted for movement into and out of said tire testing station.

10. A tire testing device as claimed in claim 8, wherein said radiation emitting heads emit X-rays.

11. A tire testing device as claimed in claim 9, wherein said radiation emitting heads emit X-rays.

12. A tire testing device as claimed in claim 1, wherein said detecting device comprises a receiver mounted outwardly of a tire in alignment with said radiation means for receiving the radiation emitted by said radiation means.

13. A tire testing device is claimed in claim 12, wherein said detecting device further includes a monitor for translating the signal received by the receiver to a visual image of the portion of the tire which is subjected to the radiation.

14. A tire testing device comprising: a frame having a base, a pair of support pillars extending upwardly from opposite ends of said base, a support shaft extending inwardly from each of said support pillars substantially parallel to base base, said support shafts being in axial alignment with one another and having their inner ends axially spaced from one another to provide a tire testing station therebetween, a pair of cooperating chucks, said chucks including means for engaging the bead edges of a tire and being mounted for rotation on said support shafts and disposed opposite one another to extend into said testing station, a pair of housings slidably mounted on said base, each of said chucks being mounted in one of said housings and axially movable relative to said support shaft and said base with said housing, spreading means for cyclically moving said housings from a normal position wherein said chucks engage a tire in said station to an expanded position wherein the cross-section of the tire retained therein is flattened and then moving said housing back to said normal position to release a tire from said testing station, means for rotating said chucks on said support shafts within said housings when said housings are in said expanded position, a detecting device for detecting tire faults, a radiation means adapted to be located inwardly of the tire for directing probing radiation through the flattened portion of the tire to said detecting device, said detecting device being adapted to detect tire faults probed by said stream of probing radiation.

15. A tire testing device as claimed in claim 14, wherein the inner ends of the support shafts are hollow and open to house said radiation means inwardly of the ends thereof, said radiating means being mounted for movement between a withdrawn position wherein said radiation means is disposed within the inner end of said support shaft and an extended position wherein the radiation means is disposed within the testing station.

16. A tire testing device as claimed in claim 15, wherein said radiation means includes a radiating head carried by each of said support shafts.

17. A tire testing device as claimed in claim 16, wherein said radiation emitting heads emit X-rays.

18. A tire testing device as claimed in claim 17, wherein said detecting device comprises a receiver mounted outwardly of a tire in said station in alignement with said radiating means for receiving the radiation emitted by said radiating means.

19. A tire testing device comprising: a frame having a base, a pair of support pillars extending upwardly from opposite ends of said base, a hollow support shaft extending inwardly from each of said support pillars substantially parallel to said base, said support shafts being in axial alignment with one another and having their inner ends axially spaced from one another to provide a tire testing station therebetween, a pair of cooperating chucks, each of said chucks including: a sleeve mounted for rotation on said support shafts, a plurality of jaw members, each of said jaw members being pivotably mounted at its inner end to said sleeve and having tire gripping ends extending outwardly from said sleeve towards said testing station, said tire gripping ends of said jaws being adapted to cooperate with one another to support the bead edges of a tire in a substantially circular configuration, said jaw members being adapted to pivot about their inner ends to radially expand or contract the tire gripping ends thereof, wedge means mounted for reciprocation on said support shaft, said wedge means being movable into engagement with said jaw members to cause them to pivot about their inner ends to radially expand the tire gripping ends thereof, spring means carried by said sleeve urging said jaw members to pivot about their inner ends to radially contract the tire gripping ends thereof when said wedge means is out of engagement with said jaw members, a housing enclosing each of said sleeves slidably mounted on said base, said sleeves being rotatably supported by said housing and axially movable therewith relative to said base, said tire gripping ends of said jaw members extending outwardly from said housing, drive means for cyclically moving said housings from an inner position wherein the tire gripping ends of said jaws engage a tire in said testing station and an outer position wherein the cross-section of the tire tread retained therein is flattened and then moving said housings back to the inner position to release the tire, a pair of radiating heads adapted to direct penetrating radiation through a tire mounted in said testing station, support means mounted inwardly of each of said hollow support shafts for supporting one of said radiating heads, cyclically operable drive means adapted to move said radiating heads from an inoperative position within said hollow support shafts to an operative position within said testing station, a receiver mounted outwardly of a tire in said testing station in alignment with said radiating heads for receiving radiation emitted by said radiation heads, a monitor for translating the signal received by said receiver to a visual image of a portion of the tire which is subjected to the radiation, rotational drive means engaging each of said sleeves for rotating a tire through at least one complete revolution in the path of said penetrating ray.

20. An improvement in the art of inspecting a series of tires comprising: conveying the tires one at a time to an inspection station, supporting a tire and moving the bead edges of the tire outwardly away from one another to substantially flatten the tire in cross-section, directing a stream of probing radiation from a source mounted inwardly of the tire through the flattened portion of the tire to a detecting device mounted outwardly of the tire, said detecting device being adaped to detect tire faults probed by said stream of probing radiation, rotating the tire to move the entire circumference of the tire through the radiation stream, moving the bead edges of the tire inwardly to return the tire to its original configuration and discharging the tire from the inspection station.

21. An improvement in the art of inspecting tires as claimed in claim 20, wherein said probing radiation is X-radiation.

22. A tire testing device comprising: an inspection apparatus having an inspection station therein and means for moving a series of tires one at a time into said inspection station, said inspection apparatus including support means adapted to engage with and disengage from opposed beads of a tire in said station, spreading means for cyclically spreading said support means from a normal position wherein the support means engages a tire to an expanded position wherein the cross-section of a tire retained therein is flattened and then back to said normal position, means for rotating said support means to rotate a tire retained therein when said support means is in said expanded position, a detecting device for detecting tire faults, radiation means adapted to direct probing radiation through the flattened portion of the tire to said detecting device, said detecting device being adapted to detect tire faults probed by said stream of probing radiation.

References Cited

UNITED STATES PATENTS

| 2,301,251 | 11/1942 | Capen | 250—83.3X |
| 2,345,679 | 4/1944 | Linse | 73—146 |
| 3,315,366 | 4/1967 | Marshall | 33—174X |

DONALD O. WOODIEL, Primary Examiner

U.S. Cl. X.R.

250—83.3